United States Patent Office 3,806,498
Patented Apr. 23, 1974

3,806,498
(1-AZIRIDINYL)ALKYL CURING AGENTS FOR ACID-TERMINATED POLYMERS
Edwin J. Wilson and Harold E. Filter, Midland, Mich., assignors to The Dow Chemical Company, Midland, Mich.
No Drawing. Filed Oct. 3, 1966, Ser. No. 583,936
Int. Cl. C08d 5/02; C08f 3/16
U.S. Cl. 260—94.2 R          17 Claims

ABSTRACT OF THE DISCLOSURE

A process is herein described for curing polymers having terminal or pendant acid groups. Said process comprises reacting by contacting said polymers with one or more (1-aziridinyl)alkyl compounds having the formula

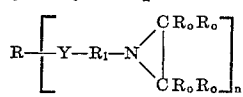

For example, tris[2 - (1 - aziridinyl)ethyl] trimelliate is a curing agent for a carboxyl-terminated polybutadiene. The cured and uncured products are compositions which are useful in many applications, e.g., in the preparation of adhesives, caulking formulations, and pyrotechnic compositions.

---

This invention relates to curable compositions containing polymers having free acid groups and a (1-aziridinyl)alkyl compound and to a process for curing polymers having free acid groups with a (1-aziridinyl) alkyl curing agent. The (1-aziridinyl)alkyl curing agents used in the present invention are desirably (1-aziridinyl) alkyl esters of carboxylic acids or esters of (1-aziridinyl) alkyl carboxylic acids and contain from 2 to 4 (1-aziridinyl)alkyl groups. The use of these curing agents gives a high degree of predictability and stability to the resulting cured compositions, increased flexibility, as well as a rapid curing rate where this is desired.

The use of compounds containing from 2 to 4 aziridinyl groups as curing agents for polymers having free acid groups is known in the art. For example, Reynolds, U.S. Pat. 3,074,917, and Hudson et al., U.S. Pat. 3,087,844, disclose the use of aziridinyl phosphone oxides and sulfides as curing agents for a wide variety of acid-terminated polymers. Abere et al., U.S. Pat. 3,147,161, disclose the use of aziridinyl compounds having the formula:

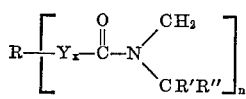

where R is an *n*-valent hydrocarbon radical, Y is —O— or —NH—, R' and R" are hydrogen or alkyl, *n* is 2 or 3 and *x* is 0 to 1, as curing agents for polymers having free carboxyl groups.

These prior art curing agents have found only limited application becaue they are isomerized during curing, resulting in unpredictable and often unsatisfactory cure properties, they tend to degrade on aging, causing "cure reversion," or they do not have a rapid enough reaction rate with acid-terminated interpolymers for certain applications, e.g., in adhesive compositions. Additionally, the prior art curing agents are solids or high viscosity liquids and therefore present processing problems in preparing the cured compositions.

SUMMARY OF THE INVENTION

It has now been discovered that these difficulties may be alleviated by utilizing a curing agent for the polymers having free acid groups which contains between 2 and 4 (1-aziridinyl)alkyl groups in place of the prior art aziridinyl curing agents. The (1-aziridinyl)alkyl group may be represented by the formula:

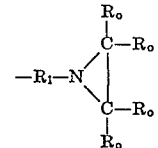

wherein $R_1$ is an alkylene group having from 1 to about 6 carbon atoms and $R_0$ is, independently in each case, hydrogen or an alkyl group having from 1 to 4 carbon atoms, e.g., methyl, ethyl, n-propyl, i-propyl, n-butyl, i-butyl, sec.-butyl, and t-butyl.

The curable compositions of this invention contain a polymer having terminal, pendant, or both terminal and pendant free acid groups and a curing agent having from 2 to 4 (1-aziridinyl)alkyl groups as in the above formula. The ratio of (1-aziridinyl)alkyl curing agent to polymer having free acid groups is preferably such that the ratio of aziridine equivalent to acid equivalent is from about 0.75:1 to about 2:1.

The curing agents are desirably (1-aziridinyl)alkyl esters of carboxylic acids or esters of (1-aziridinyl)alkyl carboxylic acids. Other compounds containing from 2 to 4 (1-aziridinyl)alkyl groups are operable and are included within the scope of the present invention. The above esters may be represented by the general formula:

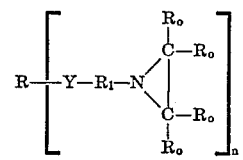

wherein:

(a) *n* is an integer of from 2 to 4, (b) $R_1$ is an alkylene group having from 1 to about 6 carbon atoms, (c) $R_0$ is, independently in each case, hydrogen or an alkyl group having from 1 to 4 carbon atoms, (d) R is an *n*-valent hydrocarbyl or hydrocarbyl substituted with one or more hydroxy, oxalo, or other groups that are inert with the (1-aziridinyl)alkyl groups under the conditions employed herein, (e) Y is

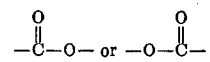

When Y is the first form given above, the compounds are (1-aziridinyl)alkyl esters of carboxylic acids. When Y has the second form given above, the compounds are esters of (1-aziridinyl)alkyl carboxylic acids.

Suitable (1-aziridinyl)alkyl esters of carboxylic acids for the process of this invention and a process for their preparation are the subject matter of a commonly owned copending application entitled "Aziridinyl Compounds," filed by William P. Coker, Prella M. Phillips, and Gordon R. Miller on the same day as the present aplication. The disclosure of that application is incorporated by reference herein. Thus, suitable (1-aziridinyl)alkyl esters of carboxylic acids may be prepared by reacting according to the process of the above copending application such esters of carboxylic saturated and unsaturated acids as dimethyl oxalate, dimethyl adipate, diethyl adipate, dimethyl succinate, methylethyl succinate, dimethyl maleate, diethyl malonate, dimethyl azelate, dimethyl pimelate, dimethyl suberate, dimethyl glutarate, dimethyl glutaconate, methyl and ethyl esters of trimellitic acid, trimesic acid, pyromellitic acid, citric acid, aconitic acid, isophthalic acid, terephthalic acid, and the like, with such aziridinyl alcohols as 2-(1-aziridinyl)-ethanol,
2-(1-aziridinyl)-1-propanol,
2-(2,3-dimethyl-1-aziridinyl)-1-butanol,
2-(2,2-diethyl-1-aziridinyl)-ethanol,
2-(2-n-butyl-1-aziridinyl)-ethanol,
1-(2-methyl-3-ethyl-1-aziridinyl)-2-butanol, and
1-(1-aziridinyl)-2-hexanol, and the like.

The preferred curing agents for the practice of this invention are compounds containing 3 or 4 (1-aziridinyl) alkyl groups. Especially preferred curing agents are the tris[(1 - aziridinyl)alkyl] trimellitates, the tris[(1 - aziridinyl)alkyl]trimesates, the tris[(1 - aziridinyl)alkyl] citrates, and the tetra[(1 - aziridinyl)alkyl] pyromellitates. These may be prepared from the trimethyl and triethyl esters of, respectively, trimellitic acid, trimesic acid, and citric acid or the tetramethyl or tetraethyl esters of pyromellitic acid reacted with the aziridinyl alkanols listed previously.

When Y has the second form given previously, i.e.

the curing agents are esters of (1-aziridinyl)alkyl carboxylic acids. Specific examples of such compounds and methods for preparing them are disclosed in Bestian, U.S. Pat. 2,596,200, the disclosure of which is incorporated by reference herein. They are prepared by the addition of alkylenimines to α,β-olefin carboxylic acid esters of polyhydric alcohols. Again, the preferred compounds for the practice of this invention are those having 3 or 4 (1-aziridinyl)alkyl groups. They may be prepared, for example, from the acrylic, methacrylic or crotonic acid esters of glycerol, 1,3,5-hexanetriol, and pentaerythritol through an addition reaction with an alkylenimine.

In addition to the two groups of (1-aziridinyl)alkyl compounds above, other compounds containing 2, 3 or 4 (1-aziridinyl)alkyl groups are suitable for the practice of this invention. Suitable examples and methods for preparing other such compounds are disclosed in Tesoro, U.S. Pat. 3,165,375, the disclosure of which is incorporated by reference herein. Additionally, such compounds as bis[2 - (1 - aziridinyl)ethyl] benzene, which may be prepared from divinyl benzene and ethylenimine, are operable.

The (1-aziridinyl)alkyl curing agents may be used either singly or as mixtures. While the bis(1-aziridinyl) alkyl compounds are operable when used alone as curing agents, they are most desirably employed in a blend with the curing agents containing three or four (1-aziridinyl) alkyl groups. The use of varying amounts of, for example, bis[2 - (1 - aziridinyl)ethyl] terephthalate with tris[2 - (1 - aziridinyl)ethyl] trimellitate allows a controlled variation of elongation properties in the cured product by varying the crosslink density.

A wide variety of polymers having terminal, pendant, or both terminal and pendant free acid groups may be cured by the use of the polyfunctional (1-aziridinyl)alkyl compounds as employed in the present invention. The polymers having free acid groups may be prepared by any of the standard solution, bulk, or emulsion polymerization techniques. The free acid groups may be present on the polymer chains as formed or may be grafted on a suitable polymer backbone. Methods for preparing polymers having terminal free acid groups are known in the art. They are typically prepared by contacting suitable monomers with organic polyalkali metal compounds, and then introducing acid groups on the polymer chains thus produced with suitable reagents such as carbon dioxide, sulfuryl chloride, and the like. Polymers containing pendant free acid groups may be prepared, for example, by the free radical polymerization of α,β-unsaturated carboxylic acids, such as acrylic acid, methacrylic acid, and the like, either as homopolymers or with other co-polymerizable vinyl monomers, such as styrene, butadiene, and the like. Additionally, polymers with both terminal and pendant free acid functionality may be employed.

While the molecular weight before curing of the polymers having free acid groups is not critical, the polymers usually have a molecular weight in the range of from about 500 to about 20,000. Since a liquid polymer is advantageous for curing according to the present invention, a molecular weight between about 500 and about 5,000 is preferred.

In order to prepare a cross-linked and hence cured polymeric product, the polymers should have an average of greater than 1 free acid group per polymer chain. In general, there is no upper limit to the number of free acid groups the polymer chains may contain. The more free acid groups per polymer chain, the more tightly cross linked is the resulting product. For the preferred rubbery compositions, the uncured polymers should contain an average of from somewhat less than about 2 to about 5 free acid groups per polymer chain.

Suitable polymers having terminal free acid groups include those prepared from such monomers as the conjugated dienes containing from 4 to 12 carbon atoms and preferably from 4 to 8 carbon atoms, such as 1,3-butadiene, isoprene, piperylene, methylpentadiene, phenylbutyldiene, 3,4-dimethyl - 1,3 - hexadiene, 4,5-diethyl-1,3-octadiene, and the like; conjugated dienes containing other active constituents along the chain such as the halogenated dienes, i.e., chloroprene, fluoroprene, and the like; aryl substituted olefins, such as styrene, various alkyl styrenes (e.g., vinyltoluene), paramethoxystyrene, vinylnaphthalene, and the like; heterocyclic nitrogen containing monomers, such as pyridine and quinoline derivatives containing at least 1 vinyl or α-methylvinyl group, such as 2-vinylpyridines, 3 - vinylpyridines, 4 - vinylpyridines, 3-ethyl - 5 - vinylpyridines, 3 - methyl - 5 - vinylpyridines, 3,5 - diethyl - 4 - vinylpyridines and the like; similar mono- and di-substituted alkenyl pyridines and like quinolines; acrylic acid esters, such as methyl acrylate, ethyl acrylate, alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene; and the like.

The above compounds, in addition to being polymerized alone, may be also polymerized with each other. In addition, copolymers can be prepared by using minor amounts of copolymerizable monomers containing more than one vinylidene group such as 2,4-divinylpyridine, divinylbenzene, 2,3 - divinylpyridine, 3,5 - divinylpyridine, 2,4 - divinyl - 6 - methylpyridine, 2,3 - divinyl - 5 - ethylpyridine, and the like. As well as homopolymers and copolymers of the above materials, block copolymers of them may also be employed.

The polymers of the above monomers are typically prepared by contacting the monomer or monomers with an organic polyalkali metal compound containing from 2 to 4 alkali metal atoms, preferably lithium. When prepared in this manner, the polymers contain an alkali metal atom on each end of the polymer chain, and the organic radical of the organo polyalkali metal compound is present in the polymer chain. These reactive polymers are heated with suitable reagents such as carbon dioxide, sulfuryl chloride, and the like, and upon hydrolysis provide polymers having terminal free acid groups. These groups include such groups as COOH, SH, $SO_2H$, $SO_3H$, $SeO_2H$, $SeO_3H$, $SiO_2H$, $SnO_2H$, $SbO_2H$, SbOH, $SbO_3H_2$, $TeO_2H$, $TeO_3H$, $AsO_2H$, AsOH, $AsO_3H_2$, $AsO_3H_3$, and the like. Reaction of the polymer containing alkali metal atoms with the acid forming reagents can be carried out over a wide range of temperature, for example between —75° C. and 75° C.; and preferably utilizing an amount of the acid forming reagent in excess of stoichiometric.

Usually, the polymers having terminal free acid groups thus prepared are liquids and have molecular weights in the range of from about 1,000 to about 20,000. However, depending upon the monomers employed in their preparation and the amount of organo polyalkali metal compound used, semi-solid and solid terminally reactive polymers can be prepared having molecular weights up to 150,000 and higher.

Suitable examples of polymers having pendant free acid groups include polyacrylic acid, polymethacrylic acid, polyacrylonitrile having a portion of the nitrile groups hydrolyzed to carboxyl groups, the interpolymers of acrylate esters and acrylic acid, acrylate esters and methacrylic acid, acrylate esters and acrylic acid and methacrylic acid, butadiene and acrylic acid, butadiene and methacrylic acid, butadiene and styrene and methacrylic acid, butadiene and acrylonitrile and acrylic acid, butadiene and acrylonitrile and methacrylic acid, chloroprene and acrylic acid, chloroprene and methacrylic acid, butadiene and acrylonitrile and ethylene sulfonic acid, and poly-alpha-sulfonylated acrylic acid.

These polymers having pendant free acid groups may be prepared according to standard emulsion, solution, and bulk polymerization techniques utilizing free radical catalysts, as discussed for example, in Brown et al., U.S. Pat. 2,937,164.

The preferred polymers having free acid groups for curing according to the present invention are those having carboxyl groups or mercapto groups. Particularly preferred are the carboxyl-terminated polybutadienes, and carboxyl containing copolymers of butadiene with acrylic acid and/or acrylonitrile.

In addition to the (1-aziridinyl)alkyl curing agent and acid terminated interpolymer, the curable compositions of the present invention may contain other ingredients, such as fillers, pyrotechnic compositions, cure rate modifiers, and the like, which will provide additional utility for the compositions. Thus, the compositions may contain amines such as dimethylaniline to slow the rate of reaction between the (1-aziridinyl)alkyl curing agent and the acid groups on the polymer chain where this is desired by neutralizing to some extent the acid. From about 0.1 to about 1.0:1 equivalents of amine to acid equivalents may be used. Fillers, such as carbon black, which enhances the physical properties and appearance of the compositions for certain uses, may be included in amounts of up to about 90 percent by weight of the total formulation. Solid propellant and pyrotechnic ingredients, including an oxidizer and a fuel, such as ammonium perchlorate and aluminum, may be included in the compositions at from about 60 to about 85 weight percent of the total formulation, to give useful pyrotechnic compositions.

The compositions of this invention may be cured by heating them at a temperature between about 15° C. and about 350° C. for a sufficient time to give a cured polymeric product. Preferred curing temperatures are from about 20° C. to about 150° C. The curing time depends on the nature of the polymer having free acid groups to be cured, the (1-aziridinyl)alkyl curing agent used, and the curing temperature. Curing times of from about 5 minutes to about 100 hours have been found advantageous.

The properties of the cured polymeric materials prepared from the compositions of this invention depend on the nature of the polymer having free acid groups used, the particular (1-aziridinyl)alkyl curing agent used, the ratio of acid to aziridine in the compositions, and the nature of fillers or other ingredients added. For example, with no fillers and a carboxy terminated polybutadiene having a molecular weight above about 1,000 cured with tris[2-(1-aziridinyl)ethyl] trimellitate in an amount sufficient to give one acid equivalent per aziridine equivalent, a very flexible elastomer is obtained. With higher ratios of aziridine to acid equivalents, such as 1.75 to 1, less flexibility and higher tensile strength is obtained with the same ingredients. The use of fillers tends to give a harder, less flexible material.

It has been established that the proportion of ingredients in the preferred carboxyl containing polymers which gives some useful properties may have ratios of aziridine equivalent to carboxyl equivalent in the range of from about 0.75:1 to about 2:1. For most applications where a moderately hard, rubbery, solid is desired, the optimum range of aziridine equivalents to carboxyl equivalents is from about 1:1 to 1.5:1.

SPECIFIC EMBODIMENTS

The following examples describe representative specific embodiments and the best modes contemplated by the inventors for practicing the invention claimed.

EXAMPLE 1

A quantity of 0.96 g. of tris[2-(1-aziridinyl)ethyl] trimellitate (equivalent weight 139) was mixed at room temperature with 9.04 g. of a liquid carboxyl terminated polybutadiene having a molecular weight of 3,770 and a carboxyl equivalent weight of 1,965. The mix was cast into a 4 inch by 2½ inch by ½ inch mold, degassed in a vacuum oven at 80° C. for 15 minutes, and placed in a curing oven at 80° C. After 24, 48, and 72 hours, samples of the rubber were removed from the oven, tensile bar specimens were cut with Die C of ASTM designation D 412–51T, and the specimens were tested on an Instron tensile tester apparatus at room temperature. The resulting tensile and elongation results are shown in the following table.

TABLE I

| | Cure time, hours | | |
| --- | --- | --- | --- |
| | 24 | 48 | 72 |
| Tensile strength, p.s.i. | 159 | 213 | 200 |
| Elongation, percent | 168 | 134 | 101 |

EXAMPLE 2

To a mixture of 0.655 g. of dimethylaniline and 10 g. of a liquid carboxyl terminated polybutadiene-acrylonitrile copolymer having a molecular weight of 3,080 and a carboxyl equivalent weight of 1,885 was added 1.125 g. of tris[2-(1-aziridinyl)ethyl] trimellitate. After mixing thoroughly, the formulation was cast into a mold as in Example 1, degassed for 15 minutes at room temperature, and cured in an oven for 24 hours at 60° C. Tensile bar specimens were cut with the same ASTM die as in Example 1 and evaluated at room temperature on the Instron tensile tester apparatus. The average results of five such samples were 422 percent elongation and 165 p.s.i. at break.

EXAMPLE 3

Samples cured at room temperature were evaluated. A composition consisting of 1.31 g. of dimethylaniline, 20.44 g. of the carboxyl terminated polybutadiene-acrylonitrile copolymer of Example 2, and 2.25 g. of tris[2-(1-aziridinyl)ethyl] trimellitate were prepared and degassed for 15 minutes at room temperature. A sample of this mix was cast into a mold as in Example 1 and allowed to stand at room temperature for 7 days exposed to the atmosphere. The sample was then removed from the mold, tensile bar specimens were cut, and they were evaluated as in Examples 1 and 2. The sample had a tensile strength of 156 p.s.i. and an elongation of 399 percent at break.

EXAMPLE 4

To a mixture of 0.173 g. of dimethylaniline and 8.075 g. of a carboxyl terminated terpolymer of polybutadiene, acrylic acid, and acrylonitrile having a molecular weight of 3,365 and a carboxyl equivalent weight of 1,370 was added 1.214 g. of tris[2-(1-aziridinyl)ethyl] trimellitate. The formation was thoroughly mixed, placed into a 60° C. curing oven for 24 hours, and then in a 110° C. curing oven for 24 additional hours. Tensile bar specimens were evaluated as in Examples 1–3, giving average results for three such specimens of 435 p.s.i. tensile strength and 171 percent elongation at break.

EXAMPLE 5

A curable pyrotechnic formulation was prepared from (A) 1.05 g. of a mixture consisting of 4.51 parts by weight of the carboxyl-terminated polybutadiene of Example 1, 2 parts by weight of aluminum powder, and 0.59 part by weight of tris[2-(1-aziridinyl)ethyl] trimellitate and (B) 1.95 of ammonium perchlorate. The carboxy terminated butadiene and aluminum were mixed and degassed at 80° C. for 15 minutes. This mix was allowed to cool to room temperature and the tris[2-(1-aziridinyl)ethyl] trimellitate was added and mixed. The ammonium perchlorate was then mixed in at 50° C. The resulting formulation was passed into a tetrafluoroethylene ASTM mold (3 inches by ¼ inch by ⅛ inch) and degassed in a vacuum chamber at 60° C. with vibration for 15 minutes. The sample was cured at 80° C. for 24 hours and tested on the Instron tensile tester apparatus, giving a tensile strength of 114 p.s.i. and 9.7 percent elongation at room temperature.

EXAMPLE 6

An adhesive composition was prepared from 1.5 equivalents of tris[2(1-aziridinyl)ethyl] trimellitate and 1 equivalent of the carboxy terminated polybutadiene of Example 1. Wood samples were lightly sanded, a small amount of the adhesive mixture was spread on a side of the wood samples, and another piece of wood was placed on this area so that the total area joined by adhesive was ¼ square inch. The pieces of wood were clamped together with a C clamp and placed in an oven to cure. The cured samples were evaluated after different curing times, giving the 180° shear strengths shown in the following table.

TABLE II

| Cure time, hrs.: | Cure temperature, °C. | 180° shear strength, p.s.i. |
|---|---|---|
| 24 | 50 | 73 |
| 46 | 50 | 80 |
| 46 | 50 } | 193 |
| 72 | 80 } | |

EXAMPLE 7

Carbon black filled adhesive mixtures consisting of (A) 75 percent by weight of a mixture of one equivalent of the carboxyl terminated polybutadiene of Example 1 and one equivalent of tris[2-(1-aziridinyl)ethyl] trimellitate curing agent and 25 percent by weight carbon black, or (B) 50 percent by weight of the polymer-curing agent mixture and 50 percent by weight of carbon black were prepared. Each mixture was mixed at room temperature to form a viscous, sticky mass. This composition was then applied to wood samples as in Example 6. The samples were cured for 80 hours at 78° C. and tested on the Instron tensile tester apparatus. The mixture containing 25 percent by weight carbon black had a shear strength of 808 p.s.i. and the mixture containing 50 percent by weight carbon black had a shear strength of 1,968 p.s.i.

EXAMPLE 8

A formulation consisting of 1 equivalent of tris[2-(1-aziridinyl)ethyl] trimellitate and 1 equivalent of the carboxyl terminated polybutadiene of Example 1 was used as a caulking formulation. A 1½" O.D. stainless steel tube with a wall thickness of 1/16" was placed vertically on a freshly sanded magnesium plate, the polymer-curing agent formulation was applied as a bead around the joint of the two metal pieces, and the assembled pieces were placed in a 78° C. curing oven for 17 hours. After removal from the oven, the tube was filled with water. No leaks were detected, and the bond between the metals held firm over a 7 day period. At that time considerable force was used to pull the metal pieces apart, with failure occurring primarily at the magnesium-caulking interface.

EXAMPLE 9

A formulation containing 0.96 g. of tris[2-(1-aziridinyl)ethyl] trimesate and 9.04 g. of the carboxyl terminated polybutadiene of Example 1 was mixed at room temperature. This mix was cast into a mold as in Example 1 and degassed in a vacuum oven at 80° C. for 15 minutes. After curing for 24 hours at 80° C., tensile bar specimens were cut from the sample and evaluated as in Example 1. These samples broke at 312 percent elongation and 139 p.s.i. tensile strength at room temperature.

EXAMPLE 10

A formulation containing (A) 0.92 g. of a mixture of tris[2-(1-aziridinyl)ethyl] citrate and bis[2-(1-aziridinyl)ethyl] ethyl citrate, prepared by heating a mixture of 3 moles of N-(2-hydroxyethyl)aziridine and 1 mole of triethyl citrate between 70° and 80° C. in the presence of sodium metal for four hours, and (B) 9.0 g. of the carboxyl terminated polybutadiene of Example 1 was mixed at room temperature. This mix was cast into a mold, degassed, cured, and evaluated as in Example 9. These samples broken at 379 percent elongation and 58.6 p.s.i. tensile strength at room temperature.

EXAMPLE 11

A quantity of 20 g. of a mercaptan (—SH) terminated liquid polybutadiene having a molecular weight of about 3,000 and having 0.0848 mercaptan equivalents/100 g. of polymer was mixed with 2.35 g. of tris[2-(1-aziridinyl)ethyl] trimellitate. The resulting mixture was poured into a mold as in Example 1, degassed at 80° C. for 15 minutes, and cured at that temperature for 72 hours. Tensile bar specimens were cut and evaluated at room temperature on the Instron tensile tester apparatus. The average results of four such samples were 318 percent elongation and 59 p.s.i. at break.

Substitution of other (1-aziridinyl)alkyl curing agents as herein described and other polymers having free acid groups as herein described in equivalent amounts for the curing agents and polymers used in the previous examples gives similar curable compositions.

EXAMPLE 12

The reaction rate of tris[2-(1-aziridinyl)ethyl] trimellitate as a curing agent was compared with N,N',N"-tris-2-ethylethylene trimesamide, a conventional trifunctional aziridinyl curing agent for acid terminated polymers, by measuring the time required for samples using the curing agents to "set up" in a 80° C. curing oven. Two samples of carboxyl terminated interpolymer of Example 1 were mixed, in an amount sufficient to give 1.5 aziridine equivalents per acid equivalent, with tris[2-(1-aziridinyl)ethyl] trimellitate and with N,N',N"-tris-2-ethylethylene trimesamide curing agent. A quantity of 10 weight percent ammonium perchlorate was added to each sample as a cure rate accelerator. The sample containing the tris[2-(1-aziridinyl)ethyl] trimellitate became set up (i.e., nonflowable) in less than 15 minutes, while the sample containing the N,N',N"-tris-2-ethylethylene trimesamide took more than six hours to become set up.

Similar advantageous results are obtained with other (1-aziridinyl)alkyl curing agents as described herein.

What is claimed is:
1. A curable composition comprising an admixture of (1) a synthetic, organic, non-proteinaceous polymer hav- ing an average of greater than 1 free acid group per polymer chain and an average molecular weight between 500 and 20,000, and (2) a curing agent having the formula

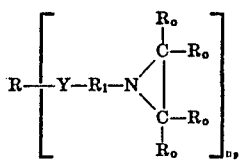

wherein (a) $n$ is an integer of from 2 to 4,
(b) $R_1$ is an alkylene group having from 1 to 6 carbon atoms,
(c) $R_o$ is hydrogen or an alkyl group having from 1 to 4 carbon atoms,
(d) R is a $n$-valent hydrocarbyl or substituted hydrocarbyl radical, and
(e) Y is

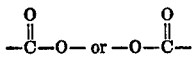

2. The curable composition defined in claim 1 wherein the average molecular weight of said polymer is between 500 and 5,000.

3. A process for curing the composition defined by claim 1 comprising warming said curable composition at a temperature between about 15° C. and about 350° C. for a time sufficient to give a cured polymeric product.

4. The curable composition of claim 1 wherein said free acid groups are —COOH, —SH, —SO$_2$H, —SO$_3$H, —SeO$_2$H, —SeO$_3$H, —SiO$_2$H, —SnO$_2$H, —SbO$_2$H, —SbOH, —SbO$_3$H$_2$, —TeO$_2$H, —TeO$_3$H, —AsO$_2$H, —AsOH, —AsO$_3$H$_2$ or —AsO$_3$H$_3$.

5. The curable composition of claim 4 wherein said free acid groups are carboxyl or mercaptan groups.

6. The curable composition of claim 5 wherein said free acid groups are carboxyl groups.

7. The curable composition of claim 1 wherein said polymer has an average of from 2 to 5 free acid groups per polymer chain.

8. The curable composition of claim 1 wherein said polymer is a carboxyl-terminated polybutadiene.

9. The curable composition of claim 1 wherein Y is

$R_o$ is hydrogen or methyl, $n$ is 3, and R is

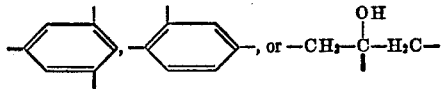

10. The curable composition of claim 1 wherein the free acid groups of the polymer are carboxyl groups or mercaptan groups.

11. The curable composition of claim 1 wherein the (1-aziridinyl)alkyl compound is tris[2-(1-aziridinyl)ethyl] trimellitate, tris[2-(1-aziridinyl)ethyl] trimesate or tris[2-(1-aziridinyl)ethyl] citrate.

12 The curable composition of claim 11 wherein the free acid groups of the polymer are carboxylic groups, and wherein the ratio of (1-aziridinyl)alkyl curing agent to acid-terminated polymer is such that the ratio of aziridine equivalent to acid equivalent is from about 0.75:1 to about 2:1.

13. The process of claim 3 wherein the free acid groups of the polymer are carboxyl groups or mercaptan groups.

14. The process of claim 3 wherein the (1-aziridinyl)alkyl compound is tris[2-(1-aziridinyl)ethyl] trimellitate, tris[2-(1-aziridinyl)ethyl] trimesate, or tris[2-(1-aziridinyl)ethyl]citrate.

15. The process of claim 14 wherein the free acid groups of the polymer are carboxyl groups, and wherein the ratio of (1-aziridinyl)alkyl curing agent to polymer is such that the ratio of aziridine equivalent to acid equivalent is from about 0.75:1 to about 2:1.

16. A cured polymeric product produced by the process of claim 15.

17. A cured polymeric product produced by the process of claim 3.

References Cited

UNITED STATES PATENTS

| | | | |
|---|---|---|---|
| 2,596,200 | 5/1952 | Bestian | 260—239 |
| 3,087,844 | 4/1963 | Hudson et al. | 149—19 |
| 3,147,161 | 9/1964 | Abere et al. | 149—19 |
| 3,165,375 | 1/1965 | Tesoro | 8—127.6 |
| 3,177,190 | 4/1965 | Hsieh | 260—94.2 |
| 2,677,681 | 5/1954 | Gill | 260—2 EN |
| 3,235,544 | 2/1966 | Christena | 260—79.5 C |

OTHER REFERENCES

Kirk-Othmer, "Encyclopedia of Chemical Technology," vol. 10, pp. 499–500, Interscience, New York (1966).

Kirk-Othmer, "Encyclopedia of Chemical Technology," vol. 16, pp. 620, Interscience, New York (1966).

Hackh's Chemical Dictionary, Fourth Edition, New York, McGraw-Hill, 1969; pp. 370 and 535.

JOSEPH L. SCHOFER, Primary Examiner

A. HOLLER, Assistant Examiner

U.S. Cl. X.R.

260—80, 80.7, 80.8, 82.1, 83.3, 86.1